May 30, 1944.  V. E. PRATT  2,350,189
VIEWING APPARATUS
Filed May 19, 1942  2 Sheets-Sheet 1

INVENTOR.
VERNEUR E. PRATT
BY
ATTORNEYS.

May 30, 1944.　　　V. E. PRATT　　　2,350,189
VIEWING APPARATUS
Filed May 19, 1942　　　2 Sheets-Sheet 2
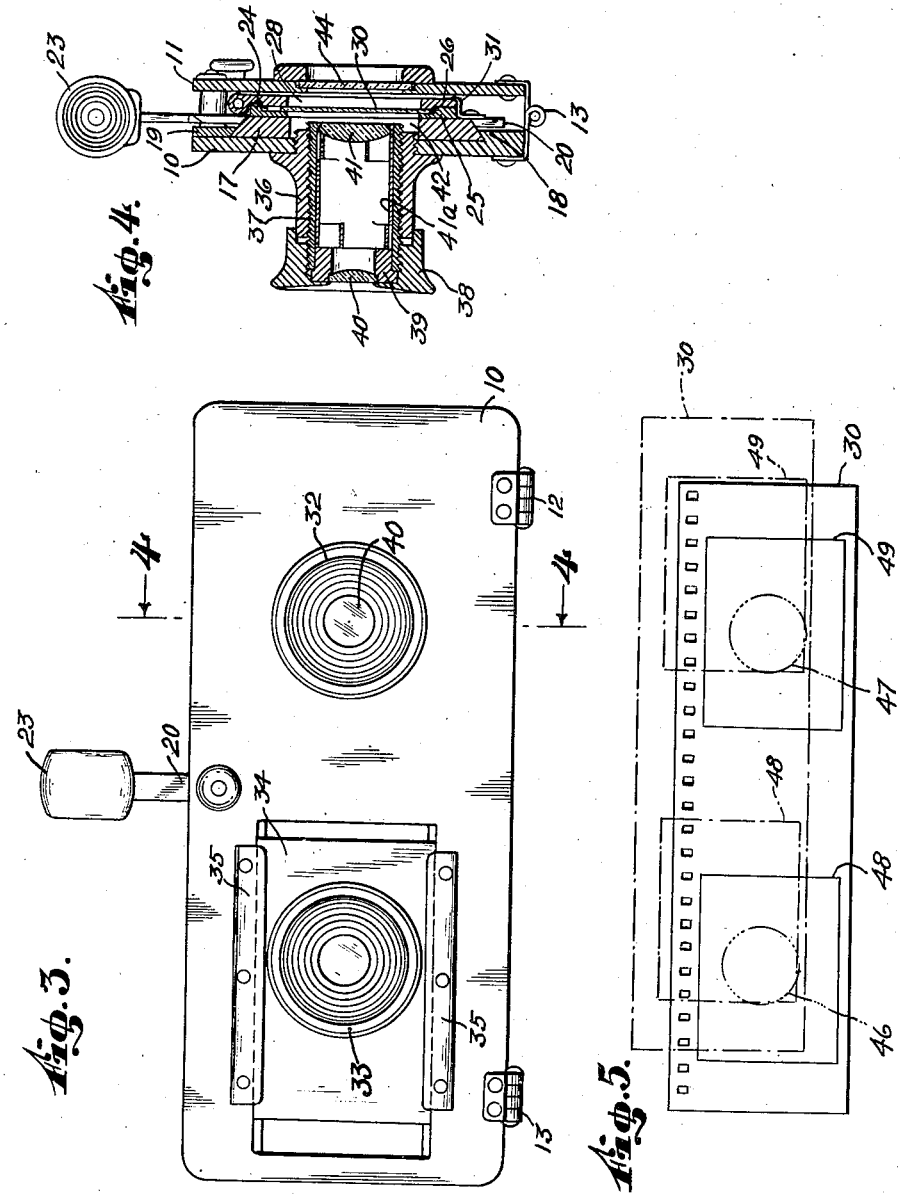
INVENTOR.
VERNEUR E. PRATT.
BY
ATTORNEYS.

Patented May 30, 1944

2,350,189

UNITED STATES PATENT OFFICE 2,350,189

VIEWING APPARATUS

Verneur E. Pratt, Norwalk, Conn., assignor to Microstat Corporation, a corporation of Delaware Application May 19, 1942, Serial No. 443,566

8 Claims. (Cl. 88—31)

The present invention pertains to improvements in viewing apparatus.

An object of the invention is to provide improved binocular viewing apparatus for microfilm and the like.

A further object is to provide improved means for rendering the subject-matter of flat documents, such as drawings, readily viewable binocularly within small compass.

A further object is to provide means of the above type including identical non-stereoscopic images of the subject-matter produced on microfilm substantially at inter-pupillary spacing and disposed in registry with individual viewing eyepieces.

Another object is to provide means of the above nature wherein the viewing lens systems are short and have fields of vision covering fractional portions of the identical images at high magnification, and wherein the film-holding apparatus is adjustable throughout a plane perpendicular to the axes of the lens systems, whereby all parts of the images may be scanned with the above-mentioned high degree of magnification.

Another object is to provide means to adjust the spacing of the viewing lens systems for individual variations in inter-pupillary spacing.

A still further object is to provide apparatus of the above nature which is light, compact, and particularly adapted to the use of workers in machining, inspection, and similar callings requiring frequent reference to the details of large drawings.

Other objects and advantages of the invention will appear in the course of the following description in connection with the accompanying drawings, in which—

Figure 3 is a rear elevation of the device;

Figure 4 is a vertical sectional view in the plane 4—4, Figure 3;

Figure 5 is a diagrammatic view illustrating the shifting of the two image frames.

Figure 1:
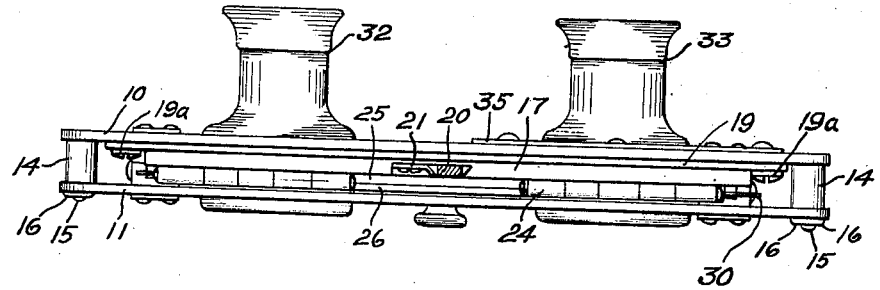
Figure 1 is a top exterior view of a preferred form of the apparatus with the shifting rod cut away.
Figure 2:
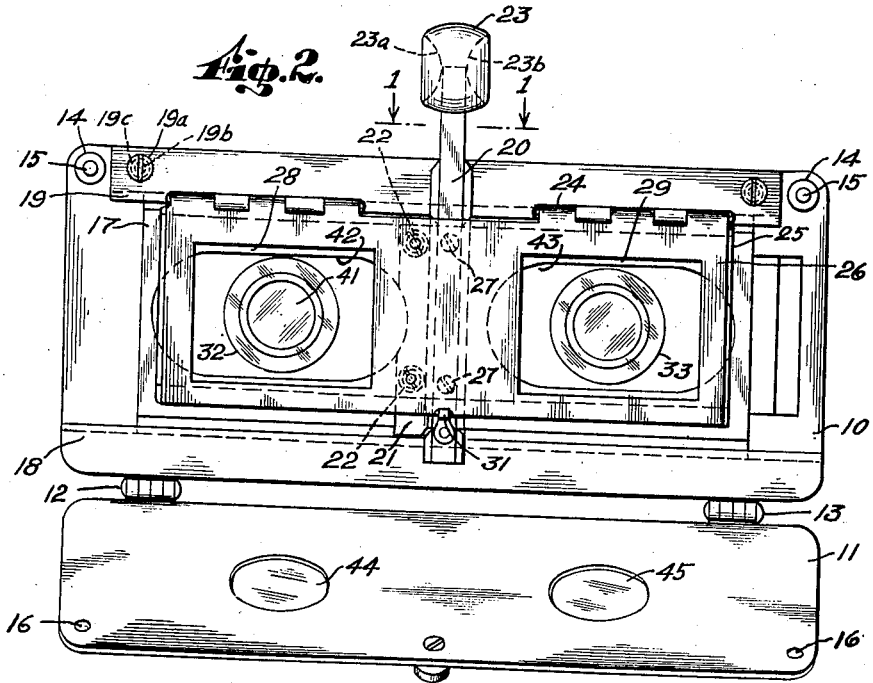
Figure 2 is a front view of the device with the screen cover opened.

Referring to Figures 1 and 2, the numeral 10 indicates a rear plate or support. A front plate 11 is joined at the bottom to the rear plate 10 by means of hinges 12 and 13, the two plates being normally spaced apart at the bottom by the construction of the hinges and at the top by spacer posts 14. The posts 14 terminate in buttons 15 normally engaging snap sockets 16 in the upper corners of the front plate 11.

A flat carriage 17 is slidably mounted between transverse dove-tail rails 18 and 19 on the front of the rear plate or support 10. The lower rail 18 may be formed integrally with the plate 10, as shown in cross section in Figure 4, or may be rigidly secured thereto.

The upper rail 19 is preferably so secured to plate 10 so as to be slightly adjustable vertically, for instance by means of clamping screws 19$^a$ having shanks 19$^b$ smaller than their clearance holes 19$^c$ in the rail 19, Figure 2. By the means described, the rail 19 may be moved downward to take up any wear between the rails and the carriage 17 and the degree of frictional resistance to sliding may be adjusted.

A flat member 20 is dovetailed in the middle of the carriage 17 so as to be vertically slidable therein, one dovetail rail 21 being adjustably secured to the carriage by means of clamping screws 22 in the manner and for the same purpose described above. The vertically slidable member or rod 20 carries on its upper end a suitable knob 23.

A film holder 24 comprises rear and front frame plates 25 and 26 hinged together at the top, the rear frame plate 25 being secured to the vertically slidable member 20 by means of countersunk screws 27. The holder 24 has two frame apertures 28 and 29 spaced at average inter-pupillary distance, each aperture being of suitable size to exhibit a frame of microfilm or the like.

Referring to Figure 4, it will be seen that the rear frame plate 25 is channelled and the front frame plate 26 is inwardly extended so as to accurately locate and hold a suitable strip film 30 in a flat plane.

A small latch 31 is provided to keep the holder 24 closed when the film is in place. It will be noted that in Figure 2 the film has been omitted or removed in order to disclose the structures behind it.

A pair of viewing eye-pieces or lens systems 32 and 33 protrude rearwardly from the rear plate or support 10. The eye-piece 32 is secured directly in the support 10, while the eye-piece 33 is secured in a small panel 34, Figure 3, the panel being laterally slidable in the support and held in place by spring clamps 35. The provision of the sliding panel mounting permits the interspacing of the two eye-pieces to be adjusted for small differences in individual interpupillary spacing of different users, as hereinafter set forth.

Figure 4 shows a typical preferred form of lens system 32, it being understood that system 33 is the optical duplicate thereof. A flanged barrel 36 is screwed into the rear plate or support 10. A sleeve 37 is threaded into the interior of the barrel 36. A cap 38 clamps in the rear end of the sleeve 37 a stepped collar 39 in which is mounted a plano-convex lens 40, the lens being mounted with its convex side inward. A field or objective plano-convex lens 41 is disposed in the front end of the sleeve 37 also with the convex side directed inwardly, the lens 41 being held in place and optical alignment with lens 40 by means of a spring spacer 41ᵃ.

It will be seen that the front end of the lens system 32 protrudes inwardly from the rear plate so as to locate the plane face of the field lens 41 at a very short focal distance from the plane of the film 30. The second eye-piece or lens system 33 is similarly mounted in the panel 34, oval clearance openings 42 and 43 being provided in the carriage 17 as shown in Figure 2.

Translucent screens 44 and 45, of ground glass or the like, are mounted in the front plate 11 in line with the lens systems to provide illuminated backgrounds for the film frames during viewing.

In operation a film strip 30 is provided with two identical frame images of the subject to be viewed, the images being spaced at the average interpupillary distance; that is, to fit the frame apertures 28 and 29, Figure 2. This film is clamped in the holder 24 with the image frames in registry with the apertures, and the front plate 11 is snapped shut. The user then looks through the eye-pieces while directing the front of the device toward any convenient source of illumination such as a window or lamp. The screens 44 and 45 are thereby illuminated and the observer sees the details of the images within the fields of vision of the lens system against the brilliant background.

If the device has not been previously adjusted to the particular interpupillary spacing of the person using it, two slightly overlapping images may appear. In this case the user adjusts the eye-piece 33 and its plate 34 laterally until the two images exactly coincide. Due to the smallness of the normal extreme variations in interpupillary spacing and the ability of the human eyes to adjust their angularity in a horizontal plane, no change in the spacing of the image frames themselves is necessary and all details of the images within the effective fields of vision of the two lens systems appear as a single sharp image.

Once the above described adjustment has been made it need not be altered again so long as the device is used by the person for whom it has been set.

The optical characteristics of the lens system described are such that at one time they cover substantial fractional portions of the film images at short focal distance and at high magnification. As a result, details of the matter being viewed may be examined with ease and minimum eye effort. When the operator wishes to view another portion of the image frame, he moves the holder 24 either vertically, horizontally or a combination of both by means of the knob 23 until the desired details appear in the fields of vision. The dovetail member 20 being vertically slidable in the carriage 17, carries the holder 24 up or down, while the horizontal movement is provided by the sliding of the carriage 17 itself between the dovetail rails 18 and 19.

Due to the fact that the sliding motions are directly vertical and horizontal, the film apertures and film images are always moved in exact parallel relation, as illustrated diagrammatically in Figure 5. In this figure the fields of vision 46 and 47 of the two lens systems are illustrated first as covering areas near the middles of image frames 48 and 49 on the film 30. When it is desired to observe details of the lower left corner of the images, shifting the holder 24 and with it the film 30 to the right and upward in the manner previously described shifts the two images in parallel relation to bring the desired areas of both into the respective fields of vision of the two viewing lens systems as illustrated in dotted and dashed lines. Similarly, by further shifting of the holder and film, the details of any desired area of the image may be brought into view for examination.

Due to the high magnification and the extremely short focal distances between the two field lenses and the film plane, it is important that these distances be very closely identical. To assure such identity, if necessary at any time, one lens system may be adjusted in the line of its axis; for example the sleeve 37, Figure 4, may be screwed inward or outward in the barrel 36, thus adjusting the distance between the plane face of lens 41 and the film 30. It will be noted that the structure of the invention as described provides for horizontal movement of the carriage 17 and hence the film 30 in the plane of the two lens axes, for up and down movement at right angles to the horizontal movement, all movements of the film being in a plane perpendicular to the lens axes and hence at a fixed focal distance from the lenses. The accuracy of the horizontal and vertical motions by which absolutely parallel shifting of the two images is secured, is highly important due to the inability of human eyes to readily adjust themselves to different angles in vertical planes. This necessary parallelism is assured by the accurately fitting and closely adjustable dove-tail mounting of the horizontal and vertical sliding members.

When the device is used with two identical or non-stereoscopic images, for example of a sheet of machine drawings, all details on the two images are viewable in identical registry, each image supplementing the other to give a maximum degree of sharpness and brilliance with the most advantageous and easy utilization of the sight of both the user's eyes. Even in the case of some photographic imperfection such as a scratch in one image, the deficiency is counteracted by the other image.

A typical example of the advantageous use of the invention is in the case of machinists working from particular details of comparatively large drawings. In such a case instead of being forced to work from large blue prints, which are unwieldy, subject to soiling, and which take up valuable room about the machines, each operator is provided with the entire data of the drawing in form so compact as to take up practically negligible room but which will reveal all desired details with high magnification and clearness to render them much easier to read than an equivalent blue print. The films are at all times enclosed within the viewer and the data images are thus protected from injury. The advantages of the invention so used, will be obvious, especially in large, crowded and busy shops, since it eliminates the providing, handling and care of many large and awkward blue prints, at the same time improving the ease and speed with which the machinists may check dimensions and details. Similar advantages will be evident in many other instances, such as inspection, checking, and in reading details of military maps at high manification.

In the foregoing description the device has been set forth principally with respect to its use of identical images of a flat subject spaced at inter-pupillary distance on a film, but it is also adapted to use with stereoscopic images so spaced, for example in study of topographical features at high magnification from aerial photographs and the like.

The shifter knob 23 may advantageously be made with concave sides 23a and 23b adapted to receive the tips of the user's index fingers.

Figure 6:
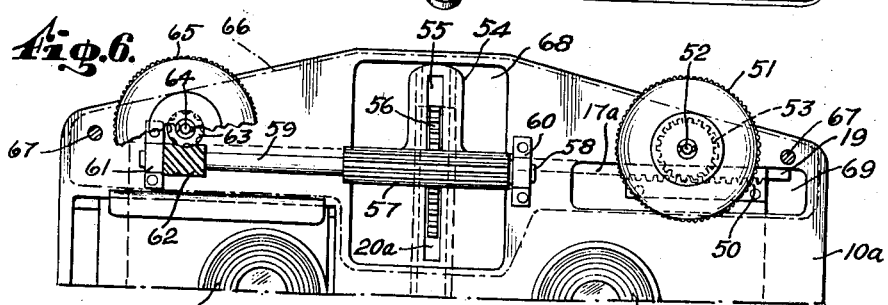
Figure 6 is a fragmental detail rear view showing an alternative form of the frame shifting means.

Figure 6 illustrates an alternative arrangement by which separate horizontal and vertical control means are provided. In this example the back plate or support 10a is extended upwardly and has a large central opening 68 and a longitudinal slot 69. A small rack 50 is secured to the back of the carriage 17a and extends rearwardly through the slot 69 with its teeth directed upward. A knurled finger wheel 51, rotatably mounted on a pin 52 secured in the back plate 10A, has secured thereto a pinion 53 meshing with the rack 50.

The carriage 17a has an upward extension 54 provided with a vertical rear slot 55. A second rack 56 is secured to the back of the vertical sliding member 20a which carries the film-holder 24 shown in prior figures. The rack 56 protrudes rearwardly through the vertical slot 55 and meshes with an elongated pinion 57, the latter having horizontal shaft extensions 58 and 59 journalled in bearings 60 and 61 on the rear plate 10a. The outer shaft extension 59 has secured thereon a spiral gear 62 meshing with a similar gear 63 rotatably held on a second pin 64 secured in the support or back plate 10a. A second finger wheel 65 is secured to the gear 63.

When the wheel 51 is revolved, as by the user's right index finger, the gear 53 moves the rack 50 and with it the carriage 17a to the right or left, depending on the direction of rotation, the teeth of the vertical rack 56 sliding along the elongated pinion 58 without change of vertical setting if the second wheel 65 is at rest. If the latter is revolved, the spiral gears 63 and 62 revolve the elongated pinion which moves the rack 56 vertically, thus shifting the vertical sliding member 20a and its attached film holder upwardly or downwardly as desired. The means described thus permits easy and fine adjustments of the film holder horizontally, vertically or in any desired combination by operating the two finger wheels.

A suitable rear cover 66, shown in dotted and dashed lines, may be provided secured to the rear plate 10a by screws 67 to house the described gearing.

While the invention has been set forth throughout in preferred form it is not limited to the exact embodiments illustrated, as various modifications may be made without departing from the scope of the appended claims.

What is claimed is:

1. In a device of the character described, in combination, a support, film holding means movably attached to said support and adapted to hold two film frames in a single plane at substantially inter-pupillary spacing, a pair of lenses attached to said support with their optical axes perpendicular to said plane and substantially at inter-pupillary spacing, said lenses being of high magnification whereby their fields of vision may respectively embrace only substantially identical fractional portions of said two film frames, and means to move said holding means on said support to shift said frames in parallel relation in said plane in two directions angular with respect to each other, whereby said fields of vision may be caused to traverse any desired portions of said frames.

2. In a device of the character described, in combination, a film strip having two identical image frames spaced at inter-pupillary distance, means to hold said film in a flat plane, a pair of viewing lenses having their optical axes at inter-pupillary spacing and perpendicular to said plane in substantially identical respective registry with said frames, said lenses being of high magnification whereby their fields of vision only embrace substantially identical fractional portions of said frames, and means to move said holding means in said plane in parallel relation and in two directions angular with respect to each other whereby said fields of vision may be caused to traverse any desired portions of said frames.

3. In a device of the character described, in combination, a pair of parallel viewing lenses spaced at interpupillary distance, a strip film having two identical images spaced substantially at inter-pupillary distance thereon, means to support said film with said two images in a single plane and in substantially identical viewing registry respectively with said two lenses, and single manually operable means to move said holding means and film in said plane in a direction parallel to the plane of the axes of said lenses and in a second direction perpendicular to said plane of said axes, whereby any corresponding small portions of said images desired may be moved to positions to be cut by said axes.

4. In a device of the character described, in combination, a pair of parallel viewing lenses spaced at inter-pupillary distance, a strip film having two identical images spaced substantially at inter-pupillary distance thereon, means to support said film with said two images in a single plane and in substantially identical viewing registry respectively with said two lenses, manually operable means to move said holding means and film in said plane in a direction parallel to the plane of the axes of said lenses, and second manually operable means independent of said first moving means to move said holding means and film in said first plane in a direction perpendicular to said plane of said axes.

5. The invention according to claim 8, including a rigid support for said lenses, and wherein said two moving means include finger wheels rotatably held on said support.

6. In a device of the character described, in combination, a support, film holding means movably attached to said support and adapted to hold two film frames in a single plane at substantially inter-pupillary spacing, a pair of lenses attached to said support with their optical axes perpendicular to said plane and substantially at inter-pupillary spacing, said lenses being of high magnification whereby their fields of vision may respectively embrace substantially identical fractional portions of said two film frames, manually operable means operatively mounted on said support and adapted to move said holding means in said plane in a straight line, and second manually operable means operatively mounted on said support and adapted to move said holding means in a second straight line in said plane independently of said first moving means.

7. In a device of the character described, in combination, a pair of parallel short focus high magnification viewing lens systems spaced at inter-pupillary distance, each of said systems comprising two plano-convex lenses, with their convex faces facing each other, means to support a pair of film image frames in the focal plane of said lens systems, said image frames being larger than the fields of vision of said lens systems, and means on said support for conjointly moving said image frames on said support in two directions angular with respect to each other, whereby corresponding portions of said image frames may be conjointly brought into the fields of vision of said lens systems.

8. In a device of the character described, in combination, a film strip having two identical image frames spaced at inter-pupillary distance, means to hold said film in a flat plane, a pair of viewing lenses having their optical axes at inter-pupillary spacing and perpendicular to said plane in substantially identical respective registry with said frames, said lenses being of high magnification whereby their field of vision only embrace substantially identical fractional portions of said frames, and manually controlled means for moving said holding means in said plane in parallel relation in two directions at right angles to each other, whereby corresponding portions of said frames may conjointly and universally be brought into said fields of vision.

VERNEUR E. PRATT.